United States Patent [19]

Lachman

[11] 3,923,667

[45] Dec. 2, 1975

[54] HIGH TEMPERATURE NIO RUBBING SEAL MATERIAL CONTAINING CUO AND CAF$_2$

[75] Inventor: Irwin M. Lachman, Corning, N.Y.

[73] Assignee: Corning Glass Works, Corning, N.Y.

[22] Filed: Oct. 29, 1974

[21] Appl. No.: 518,598

[52] U.S. Cl. ............... 252/12; 106/63; 106/73.1; 165/9; 252/12; 277/96 R
[51] Int. Cl.$^2$ .............. C04B 35/02; C10M 5/02
[58] Field of Search ............. 106/73.1, 63; 252/12; 277/96; 165/9; 117/93.1 PF

[56] References Cited

UNITED STATES PATENTS

| | | | |
|---|---|---|---|
| 3,370,006 | 2/1968 | Campbell | 252/12 |
| 3,429,720 | 2/1969 | Houston et al. | 252/12 X |
| 3,481,715 | 12/1969 | Whalen et al. | 117/93.1 PF |
| 3,659,861 | 5/1972 | Rao et al. | 277/96 R |
| 3,746,352 | 7/1972 | Rao et al. | 277/96 R |

FOREIGN PATENTS OR APPLICATIONS

| | | | |
|---|---|---|---|
| 278,938 | 11/1970 | U.S.S.R. | 252/12 |
| 47-13813 | 4/1972 | Japan | 252/12 |

*Primary Examiner*—Helen M. McCarthy
*Attorney, Agent, or Firm*—Barry S. Bissell; Richard N. Wardell; Clarence R. Patty, Jr.

[57] ABSTRACT

Sealing member having a low coefficient of friction and good wear resistance at elevated temperatures, particularly when used as a rubbing seal against ceramic rotary regenerators in gas turbine engines. The sealing member is a sintered ceramic member made from a batch of nickel oxide, copper oxide, and combinations of CaF$_2$ and SrF$_2$, with a preferred analytical composition of 34–62 weight percent NiO, 14–28 weight percent CaF$_2$ and 24–38 weight percent CuO.

8 Claims, No Drawings

HIGH TEMPERATURE NIO RUBBING SEAL MATERIAL CONTAINING CUO AND CAF$_2$

BACKGROUND OF THE INVENTION

Rotary regenerators for gas turbine engines are being made of ceramic and glass-ceramic materials capable of effective heat transfer at elevated temperature. In particular, CERCOR cellular glass-ceramic regenerators, made by Corning Glass Works and chemically comprising beta-spodumene solid solution as the primary crystal phase, are being tested by the industry.

Sealing members must be used in the gas turbine engine to separate the counter current gas flow paths and to seal the periphery of the rotary regenerator. The sealing members are preferably in rubbing contact with the regenerator and therefore must have a low coefficient of friction and good wear resistance, as well as good sealing properties, at operating temperatures of at least about 750°C. An additional requirement eliminates many carbides, metal oxides and other potential materials; that requirement being that seal materials should not significantly abrade or wear the ceramic regenerator.

The present invention presents a ceramic material with the requisites of a good seal material. Prior art patents presenting sealing materials akin to the present materials include U.S. Pat. Nos. 3,370,006 and 3,746,352. The former patent discloses, inter alia, flame-sprayed nickel oxide base coatings containing 5–25% of Group IIa fluorides. The latter patent discloses a seal member comprising a metal substrate and a flame-sprayed surface layer wherein, although not preferred, the surface layer may consist of a glaze producing material containing calcium fluoride and a matrix material of cuprous oxide. The present applicants have now found a series of sintered ceramic seal materials which are equal to or better than the prior art flame sprayed seal materials with respect to coefficient of friction and wear resistance. The sintered nature allows a more economically fabricated seal than the flame sprayed variety, and a seal which can easily be made thick enough to outlast the life of the turbine engine.

SUMMARY OF THE INVENTION

The invention is a sintered ceramic sealing member for gas turbine engines of the type having ceramic rotary regenerators therein. Seal members made according to the invention analytically consist essentially of 8–76% NiO, 5–40%, CaF$_2$, SrF$_2$ or mixtures thereof, and 10–52% CuO. Calcium fluoride is the preferred metal fluoride and the preferred compositional range is 34–62% NiO, 14–28% CaF$_2$ and 24–38% CuO. Seals made according to the broad composition range have coefficients of friction of less than about 0.40 or wear rates of less than about 0.0040 inches/100 hours (0.1 mm/100 hours) in the Applicant's tests. Seals with compositions within the narrower range have coefficients of friction of less than about 0.30 or wear rates of less than about 0.0010 inches/100 hours (0.025 mm/100 hours).

Sintering temperatures of ceramic seals according to the invention should be generally below about 1100°C. in air, since a liquid phase forms above this temperature. The Applicant theorizes that the liquid is a Cu$_2$O—CuO eutectic. Firings can be made at slightly higher temperatures in oxygen atmosphere because of the suppression of the Cu$_2$O.

At operating temperatures of 760°C. the phases in the sintered seals are NiO—CuO solid solution + CuO + CaF$_2$ (or SrF$_2$). On the seal surface during operation, however, the compound 6CuO.Cu$_2$O has consistently been found. The small amount of the lower valence copper may be due to significantly higher temperatures on the rubbing surface. In any event, it appears that this 6CuO.Cu$_2$O phase may be responsible for the better film forming properties of the NiO.CuO.CaF$_2$ and NiO.CuO.SrF$_2$ compositions, of the present invention, both on the seal surface and on the regenerator surface. This thin film surface yields lower friction and wear characteristics for the present CuO containing seal materials when rubbing against the ceramic regenerators.

Methods of fabricating the seals herein include conventional ceramic material processes but the preferred method is by dry pressing. The seal may also be ceramically bonded to a substrate, but in either case, the formed ceramic seal is mechanically fixed in the turbine engine in rubbing contact with the regenerative matrix. One possible assembly in a turbine engine which can be duplicated with the present sliding seals is shown in U.S. Pat. No. 3,647,228, assigned to the Ford Motor Company.

In the dry pressing method of fabrication, the raw material powders are batched according to the limits of the invention and are reduced in particle size by milling in a liquid medium with known binders and plasticizers. The batch is then dried, granulated and isostatically pressed, followed by calcination, preferably in an oxygen atmosphere. The calcined material is subsequently reduced to −325 Tyler mesh powder, binder is added, and the mixture granulated. Seals or test specimens are then dry pressed and isostatically repressed at 20,000 psi (1406 kg/cm$^2$) and fired at about 1050°C., again preferably in an oxygen atmosphere.

DESCRIPTION OF THE PREFERRED EMBODIMENT

EXAMPLE 1

Samples for friction and wear testing were made according to the following procedure. A 400 grams batch of a mixture of green nickel oxide, CuO and CaF$_2$ or SrF$_2$ (in the percentages shown in Table I) was milled for each sample composition in a ball mill for 4 hours with about 200 cc of 1,1,1-trichlorethane, 12 grams of Carbowax 4000 (Dow Chemical Co. trademark) and 8 cc of ricinoleic acid. After milling, each batch was dried, granulated and hydrostatically pressed at 20,000 psi (1406 kg/cm$^2$). The pressed bodies were calcined at 1000°C. for about 6 hours in oxygen and then reduced to −325 Tyler mesh particles. 3 weight percent of the disclosed Carbowax 4000 was added to the powder followed by granulation and screening of the powder through a 10 Tyler mesh screen. Test samples were dry pressed and then hydrostatically repressed at 20,000 psi (1406 kg/cm$^2$) and fired at 1050°C. for about 6 hours in an oxygen atmosphere.

Samples 0.4 inches by 2.5 inches by 0.25 inches thick (1 cm × 6.3 cm × 0.6 cm) were cut from the pressed bodies and tested for friction and wear against a CERCOR honeycomb regenerative matrix 760°C. The matrix was 9 inches (23 cm) in diameter and was driven at 50 RPM. The seal samples were mounted in a holder and forced against the face of the matrix such that the pressure on the face of the seal sample was a constant 7 psi (0.5 kg/cm²). Measurement of the force necessary to prevent sample rotation was measured by a load cell in communication with a torque arm supporting the sample mounting means. Using the force to prevent rotation, the area of contact, and the applied load, the coefficient of friction was calculated and reported in Table I. Wear rates were determined by direct measurement after the test run.

tions, $SrF_2$ containing seals may be preferred over $CaF_2$ containing seals.

I claim:

1. A sintered ceramic sliding seal for contacting a ceramic regenerator in a gas turbine engine analytically consisting essentially of, by weight, 8–76% NiO, 10–52% CuO and 5–40% of a metal fluoride selected from $CaF_2$, $SrF_2$ and combinations thereof.

2. The sliding seal of claim 1 wherein the metal fluo-

TABLE I

| Sample No. | Batch Composition (wt.%) | | | | Coefficient of Friction ($\mu$) | Wear (mm/100 hours) | Length of Test (hours) |
| --- | --- | --- | --- | --- | --- | --- | --- |
| | NiO | CuO | $CaF_2$ | $SrF_2$ | | | |
| 1 | 40 | 38.5 | 21.5 | | 0.35 | 0.010 | 160 |
| 2 | 37.5 | 35.5 | 27 | | 0.29 | 0.046 | 60 |
| 3 | 39 | 37 | 24 | | 0.30 | 0.012 | 267 |
| 4 | 47 | 30 | 21 | | 0.30 | 0.025 | 93 |
| 5 | 57.5 | 28 | 14.5 | | 0.33 | 0.046 | 68 |
| 6 | 34 | 32 | 34 | | 0.30 | 0.051 | 55 |
| 7 | | | | | | | |
| 8 | 36 | 34 | 30 | | 0.28 | 0.043 | 70 |
| 9 | 40 | 38.5 | 21.5 | | 0.32 | 0.015 | 160 |
| 10 | 42 | 40 | 18 | | 0.30 | 0.023 | 106 |
| 11 | 40.5 | 49 | 10.5 | | 0.43 | 0.008 | 125 |
| 12 | 59 | 20 | 21 | | 0.28 | 0.028 | 110 |
| 13 | 63 | 16 | 21 | | 0.30 | 0.087 | 97 |
| 14 | 78 | 2 | 20 | | 0.29 | 0.334 | 139 |
| 15 | 20 | 58 | 22 | | 0.43 | 0.033 | 39 |
| 16 | 0 | 77 | 23 | | 0.60 | 0.071 | 25 |
| 17 | | 73.5 | | 26.5 | 0.45 | 0.091 | 2 |
| 18 | 34 | 34 | | 32 | 0.35 | 0.064 | 50 |
| 19 | 40 | 40 | | 20 | 0.38 | 0.015 | 102 |
| 20 | 37 | 37 | | 26 | 0.36 | 0.025 | 86 |
| 21 | 59 | 15 | | 26 | 0.22 | 0.185 | 36 |

Values for frictional coefficients and wear rates for current flame sprayed $NiO \cdot CaF_2$ compositions for the same test are in the range of 0.30 and 0.0010 inches/100 hours (0.025 mm/100 hours), respectively. The flame-sprayed seal is, however, generally quite thin because of the time and expense necessary to lay down the material on the substrate whereas the sintered seal of the present invention may be made as thick as necessary to match the useful life of the turbine engine.

The $NiO—CuO—SrF_2$ sintered seals have properties quite similar to those of the $NiO—CuO—CaF_2$ seals. In addition, the $SrF_2$ containing seals are more hydration resistant and may therefore be more attractive. The effect of hydration can be dramatic in extreme cases where the seal can be reduced to powder. In a simulated test conducted by the applicant, both $CaF_2$ and $SrF_2$ were subjected to an air/steam mixture for 4 hours at 800°C. with the resulting products being analyzed for phase changes. Both masses hydrolyzed, the $CaF_2$ partially going to CaO and $Ca(OH)_2$ and the $SrF_2$ to $SrCO_3$. The $SrCO_3$, however, is rather stable up to about 1250°C. whereas the $Ca(OH)_2$ decomposes at about 545°C. Therefore, under certain service condiride is $CaF_2$.

3. The sliding seal of claim 1 analytically consisting essentially of 34–62% NiO, 24–38% CuO and 14–28% of the selected metal fluoride.

4. The sliding seal of claim 3 wherein the metal fluoride is $CaF_2$.

5. A sliding seal for contacting a ceramic regenerator in a gas turbine engine comprising a sintered product of a raw material batch consisting essentially of 8–76 weight percent NiO, 10–52 weight percent CuO and 5–40 weight percent of a metal fluoride selected from $CaF_2$, $SrF_2$ and mixtures thereof.

6. The sliding seal of claim 5 wherein the raw material batch consists essentially of 34–62 weight percent NiO, 24–38 weight percent CuO and 14–28 weight percent of the metal fluoride.

7. The sliding seal of claim 6 wherein the metal fluoride is $CaF_2$.

8. The sliding seal of claim 6 wherein the sintering temperature of the raw material batch is less than about 1100°C.

* * * * *

UNITED STATES PATENT OFFICE
CERTIFICATE OF CORRECTION

PATENT NO. : 3,923,667
DATED : December 2, 1975
INVENTOR(S) : Irwin M. Lachman

It is certified that error appears in the above-identified patent and that said Letters Patent are hereby corrected as shown below:

TABLE I - Column 3 & 4. Move sample No. 7 up to align with rest of columns across.

Signed and Sealed this twenty-third Day of March 1976

[SEAL]

Attest:

RUTH C. MASON
*Attesting Officer*

C. MARSHALL DANN
*Commissioner of Patents and Trademarks*